(12) United States Patent
Anderson et al.

(10) Patent No.: US 8,200,860 B2
(45) Date of Patent: Jun. 12, 2012

(54) APPARATUS AND METHOD TO PERFORM A VERSION PRE-CHECK OF A STORAGE CONTROLLER COMMAND

(75) Inventors: Dale Howard Anderson, Tucson, AZ (US); Jason Lee Peipelman, Vail, AZ (US); Joshua Marshall Rhoades, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 12/371,435

(22) Filed: Feb. 13, 2009

(65) Prior Publication Data

US 2010/0211606 A1    Aug. 19, 2010

(51) Int. Cl.
 *G06F 17/30*    (2006.01)
(52) U.S. Cl. .................... 710/48; 710/8; 710/9; 710/10; 711/135; 711/161; 707/792
(58) Field of Classification Search .................. 710/8–1, 710/48; 711/135, 161
See application file for complete search history.

(56) References Cited

U.S. PATENT DOCUMENTS

| | | | |
|---|---|---|---|
| 6,442,753 B1 | 8/2002 | Gerard et al. | |
| 6,496,900 B1 * | 12/2002 | McDonald et al. | 711/112 |
| 7,131,122 B1 | 10/2006 | Lakhdhir | |
| 2006/0218538 A1 | 9/2006 | van Kestern | |
| 2008/0072217 A1 | 3/2008 | Li et al. | |
| 2009/0106628 A1 * | 4/2009 | Aciicmez et al. | 714/763 |

* cited by examiner

*Primary Examiner* — Tammara Peyton
(74) *Attorney, Agent, or Firm* — Dale F. Regelman; Quarles & Brady LLP

(57) ABSTRACT

A method to perform a version pre-check of a storage controller command, wherein the method extracts a plurality of objects from a storage controller command, and determines, without querying the storage controller, if each object comprising a method or a method parameter is enabled on that storage controller. If each object comprising a method or a method parameter is enabled on the storage controller, the method indicates success for a version pre-check of the storage controller command.

10 Claims, 5 Drawing Sheets

APPARATUS AND METHOD TO PERFORM A VERSION PRE-CHECK OF A STORAGE CONTROLLER COMMAND

FIELD OF THE INVENTION

The invention relates to an apparatus and method to perform a version pre-check of a storage controller command.

BACKGROUND OF THE INVENTION

Data storage systems are used to store large amounts of information received from one or more sources. A data storage system often comprises a storage controller in communication with one or more clients, often referred to as "hosts," and also in communication with a plurality of data storage devices. A host computing device may send a storage controller a write command to write certain information to a data storage medium, and/or a read command to read information from a data storage medium, and/or a copy command to copy information from one data storage medium to another data storage medium. Host computers may also provide commands to a storage controller to establish or revise physical and/or logical configurations. In certain embodiments, a read command, or a write command, or a copy command, or a configuration command comprises a plurality of objects packaged in one command. If a host computer sends a command that is unsupported, i.e. not enabled, or a command parameter that is unsupported, certain APIs in the storage controller may simply drop or disregard that command.

Certain commands comprise method objects. As a result, a default serialization protocol is unable to determine if the actual method is supported on the receiving storage controller. An error will occur when a method call is made on the storage controller.

It is inefficient to query the storage controller each time a storage controller command is generated to determine if that command is supported. Such a procedure consumes inordinate amounts of communication bandwidth that is better utilized for actual I/O operations.

SUMMARY OF THE INVENTION

Applicants' invention comprises a method to perform a version pre-check of a storage controller command. The method extracts a plurality of objects from a storage controller command, and determines, without additional queries to the storage controller, if each object comprising a method or a method parameter is enabled on that storage controller. If each object comprising a method or a method parameter is enabled on the storage controller, the method indicates success for a version pre-check of the storage controller command.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 4:
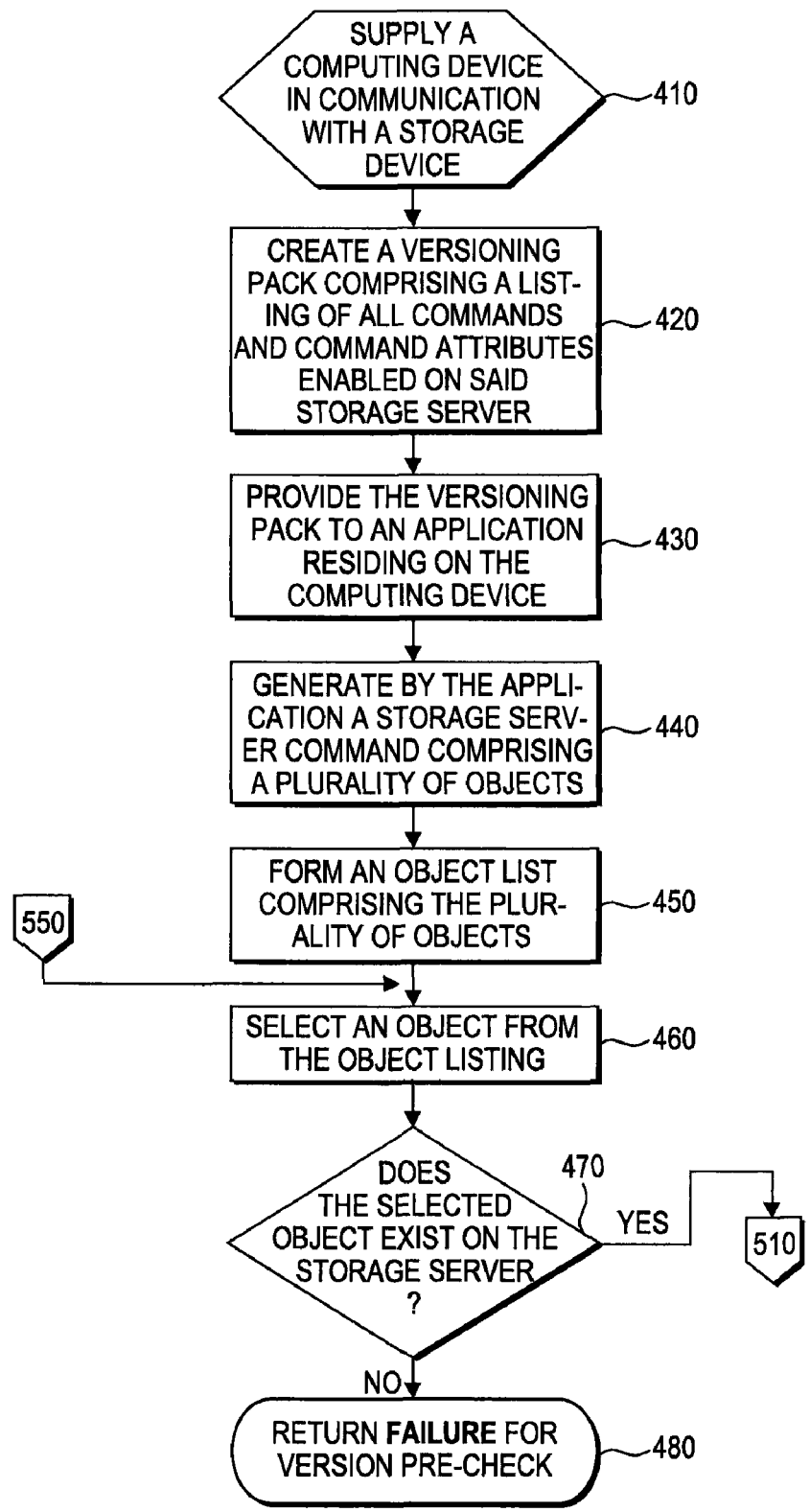
FIG. 4 is a flow chart summarizing certain steps in Applicants' method.
Figure 5:
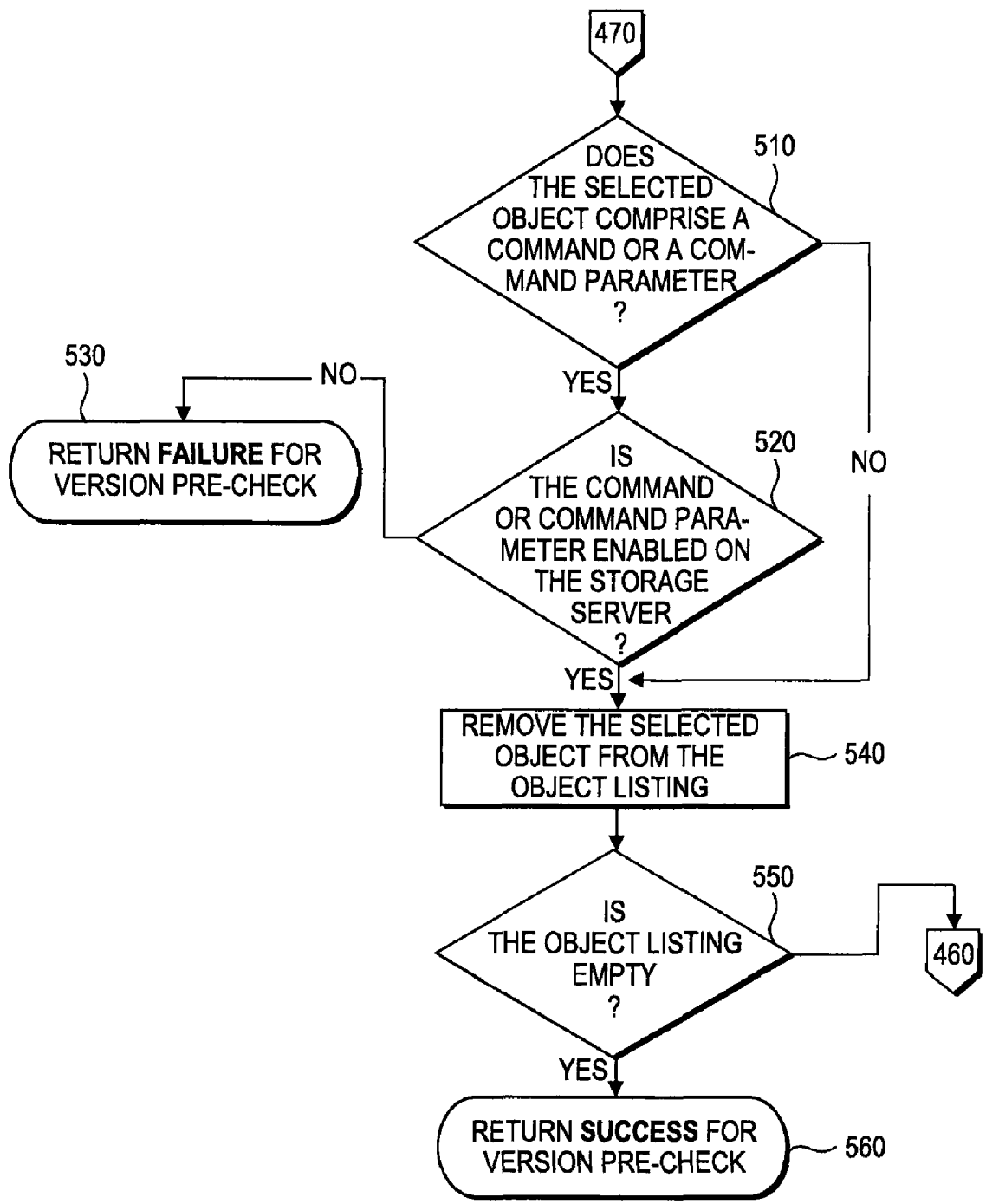
FIG. 5 is a flow chart summarizing certain additional steps in Applicants' method.

The schematic flow chart diagram included are generally set forth as logical flow-chart diagrams (e.g., FIGS. 4 and 5). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIGS. 4 and 5). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
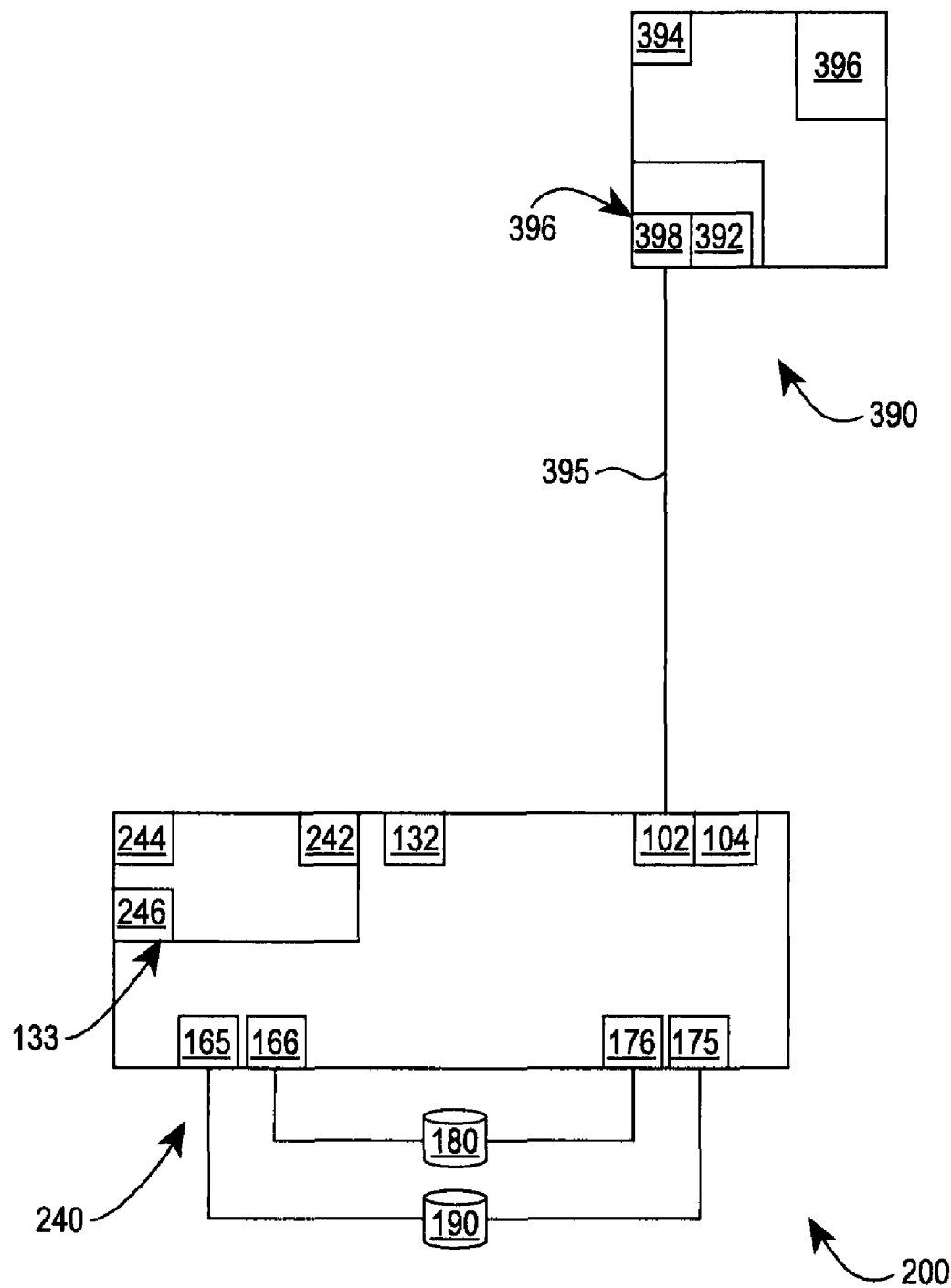
FIG. 2 is a block diagram showing a host computer in communication with a storage controller.

Referring to FIG. 2, data storage system 200 includes storage controller 240 which interconnects a plurality of data storage drives 180 and/or a plurality of data storage drives 190, with a computing device 390. Storage controller 240 comprises a processor 132 and computer readable memory 133, instructions 242 written to computer readable memory 133, a plurality of supported, i.e. enabled, commands 244 written to computer readable memory 133, and a plurality of supported, i.e. enabled, command parameters 246 written to computer readable memory.

In certain embodiments, storage controller 240 communicates with the plurality of data storage devices 180 via device adapters 165 and 175, and with plurality of data storage devices 190 via device adapters 166 and 176, using an I/O protocol selected from the group consisting of SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

Figure 3:
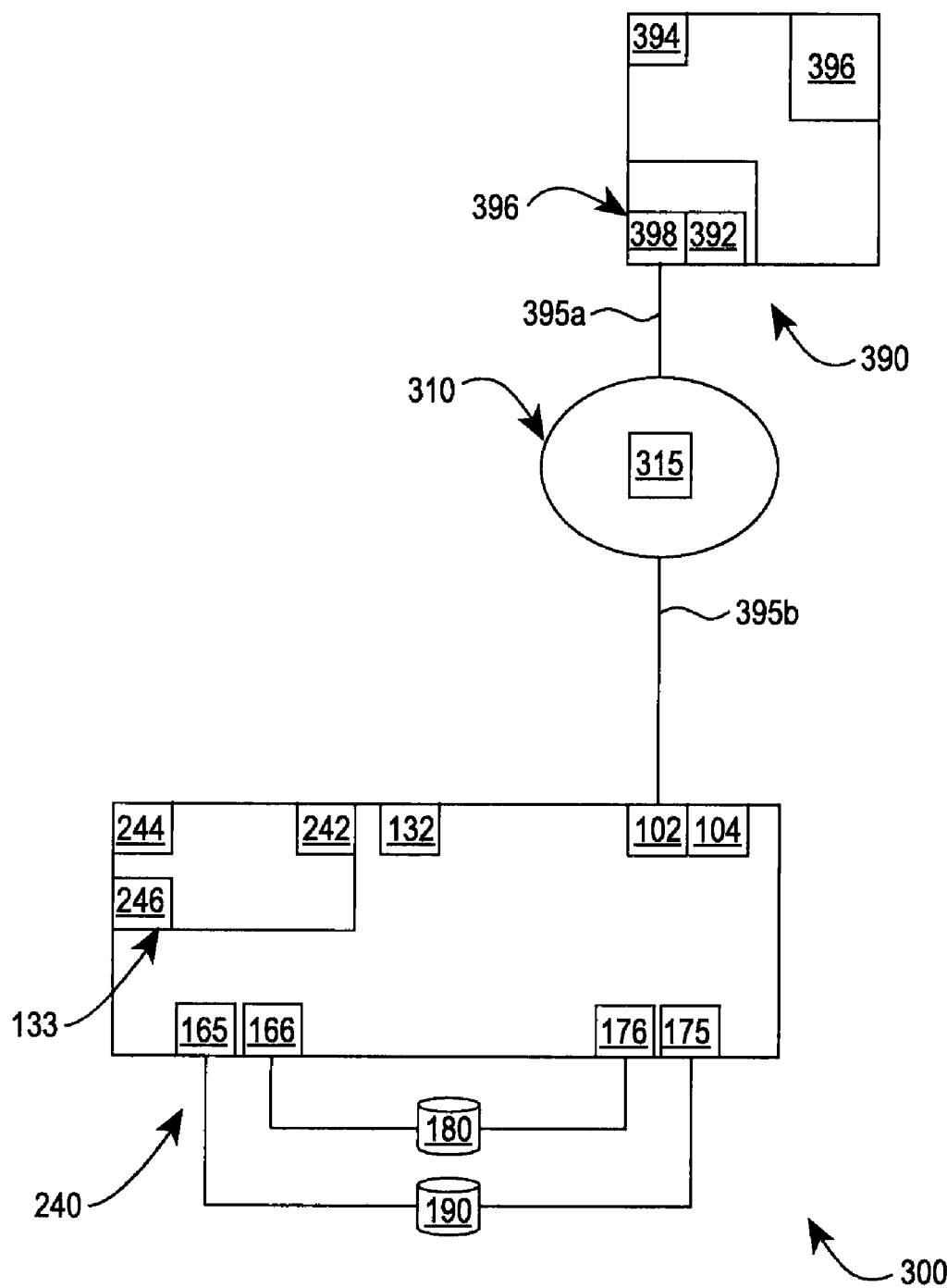
FIG. 3 is a block diagram showing a host computer and a storage controller communicating with one another via a fabric.

In the illustrated embodiments of FIGS. 2, and 3, computing device 390 comprises a processor 394 and computer readable storage medium 396, wherein instructions 398 are encoded in computer readable storage medium 396. In the illustrated embodiments of FIGS. 2, and 3, computing device 390 further comprises application 396. In certain embodiments, application 396 comprises a storage management program to manage the transfer of data to and from a data storage controller. In certain embodiments, that storage management program may include the functionality of the IBM DFSMS implemented in the IBM MVS operating system.

In certain embodiments, computing device 390 comprises a host computer, wherein that host computer generates data, and provides that data to storage controller 240. Storage controller 240 writes that data to one or more of a plurality of data storage devices 180 and/or 190. Further in the illustrated embodiment of FIG. 2, storage controller 240 is in communication with one host computer 390. In other embodiments, storage controller 240 is in communication with a plurality of host computers. As a general matter, hosts computers 390 includes a computing device, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).

In the illustrated embodiment of FIG. 3, host computer 390 and storage controller 240 communicate with one another via fabric 310. In certain embodiments, fabric 310 includes, for example, one or more Fibre Channel ("FC") switches 315. In certain embodiments, those one or more switches 315 include one or more conventional router switches. In the illustrated embodiment of FIG. 3, one or more switches 315 interconnect host computer 390 to storage controller 240 via communication paths 395a and 395b using any type of I/O interface, for example, FC, Infiniband, Gigabit Ethernet, Ethernet, TCP/IP, iSCSI, SCSI I/O interface, or one or more signal lines used by FC switch 315 to transfer information through, to, and from storage controller 240, and subsequently the plurality of data storage devices 180 and/or 190.

In the illustrated embodiments of FIGS. 2 and 3, host computer 390 is interconnected to host adapter 102 disposed in storage controller 240 via communication link 395. The illustrated embodiment of FIG. 2 shows host computer 390 interconnected with storage controller 240 via one communication link. The illustrated embodiment of FIG. 3 shows host computer 390 interconnected with fabric 310 via one communication link. In other embodiments, host computer 390 is interconnected with storage controller 240/fabric 310 with more than one communication link. In certain embodiments, communication link 395 may be configured to comprise up to 256 logical communication paths.

Figure 1:
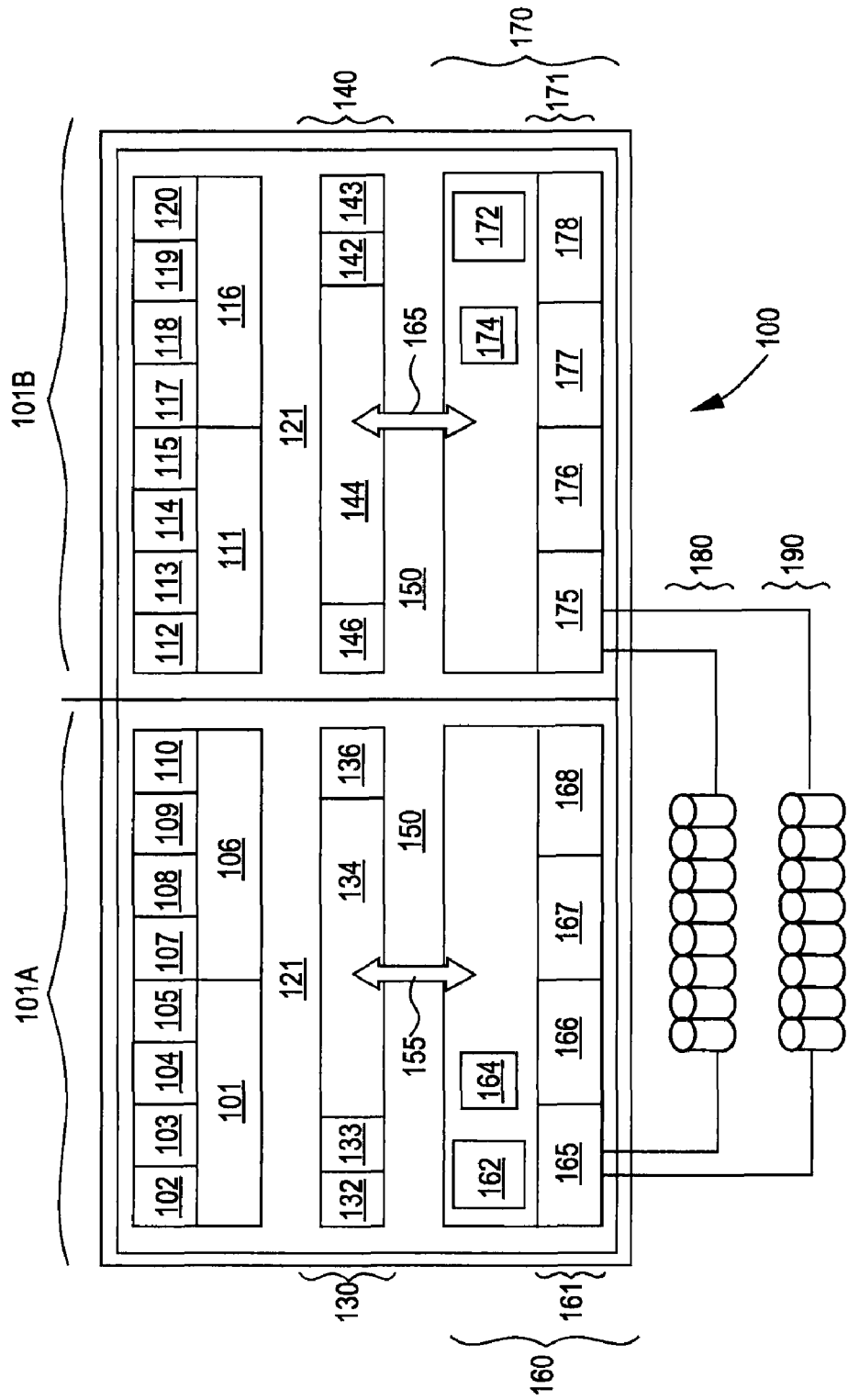
FIG. 1 is a block diagram showing one embodiment of Applicants' storage controller.

Referring now to FIG. 1, in certain embodiments, storage controller 240 comprises a data storage library, such as for example and without limitation, data storage library 100. In certain implementations, data storage library 100 includes a first cluster 101A and a second cluster 101B, wherein clusters 101A and 101B are disposed in the same housing. In the illustrated implementation of FIG. 1, data storage library 100 includes a plurality of host adapters 102-105, 107-110, 112-115, and 117-120, disposed in four host bays 101, 106, 111, and 116. In other implementations, data storage system includes fewer than 16 host adapters. Regardless of the number of host adapters disposed in any implementations of the system, each of those host adapters includes a shared resource that have equal access to both central processing/cache elements 130 and 140.

Each host adapter may comprise any kind of I/O interface. Each host adapter is connected to both clusters 101A and 101B through interconnect bus 121 such that each cluster can handle I/O from any host adapter, and such that the storage controller portion of either cluster can monitor the communication path error rate for every communication path, physical and/or logical, interconnected with data storage library 100.

Storage controller portion 130 includes processor 132, computer readable storage medium 133, cache 134, and non-volatile storage ("NVS") 136. In certain implementations, computer readable storage medium 133 includes random access memory. In certain implementations, computer readable storage medium 133 includes non-volatile memory.

Storage controller portion 140 includes processor 142, computer readable storage medium 143, cache 144, and NVS 146. In certain embodiments, computer readable storage medium 143 includes random access memory. In certain embodiments, computer readable storage medium includes non-volatile memory.

I/O portion 160 includes a plurality of device adapters, such as device adapters 165, 166, 167, and 168. I/O portion 170 further includes a plurality of device adapters, such as device adapters 175, 176, 177, and 178.

In certain embodiments of the system, one or more host adapters, storage controller portion 130, and one or more device adapters, are packaged together on a single card disposed in the data storage system. Similarly, in certain embodiments, one or more host adapters, storage controller portion 140, and one or more device adapters, are disposed on another card disposed in the data storage system. In these embodiments, system 100 includes two cards interconnected with a plurality of data storage devices.

In the illustrated embodiment of FIG. 1, sixteen data storage devices are organized into two arrays. In other embodiments, the data storage system includes more than two storage device arrays. In certain embodiments, each storage array appears to a host computer as one or more logical devices.

In certain embodiments, arrays 180 and/or 190 utilize a RAID (Redundant Array of Independent Disks) protocol. In certain embodiments, arrays 180 and/or 190 include what is sometimes called a JBOD array, i.e. "*Just a Bunch Of Disks*" where the array is not configured according to RAID. As those skilled in the art will appreciate, a RAID rank includes independent disk drives configured in an array of disk drives to obtain performance, capacity and/or reliability that exceeds that of a single large drive.

FIGS. 4 and 5 summarizes Applicants' method to perform a version pre-check of a storage controller command prior to sending the command to the storage controller. Referring now to FIG. 4, in step 410 the method supplies a client computing device, such as computing device 390, in communication with a storage controller, such as storage controller 100 and/or storage controller 240 (FIGS. 2, 3).

In step 420, the method creates a Version Pack, such as Version pack 392, comprising a listing of all commands and command parameters enabled on the storage controller. In certain embodiments, step 420 is performed by a client computing device in communication with the storage controller. In certain embodiments, step 420 is performed by a storage controller. In certain embodiments, the Version Pack is built based upon introspection of the extant program code and does not require any developer maintenance.

In step 430, the method provides the Version Pack of step 420 to an application, such as application 396, disposed on the client computing device of step 410. In certain embodiments, step 430 is performed by the client computing device of step 410. In certain embodiments, step 430 is performed by the storage controller of step 410.

In step 440, an application, such as application 396, executed on the client computing device of step 410, such as computing device 390, generates a command for the storage controller of step 410, wherein that command comprises a plurality of objects. In step 450, the method forms an object list comprising the plurality of objects recited in the command of step 440. In certain embodiments, step 450 is performed by the client computing device of step 410. In certain embodiments, step 450 is performed by an application running on the client computing device of step 410.

In step 460, the method selects an object recited on the object list. In certain embodiments, step 460 is performed by the client computing device of step 410. In certain embodiments, step 460 is performed by an application running on the client computing device of step 410.

In step 470, the method determines if the selected object of step 460 exists on the storage controller of step 410. In certain embodiments, step 470 comprises comparing the selected object of step 460 with the Version Pack of step 420. In certain embodiments, step 470 is performed by the client computing device of step 410. In certain embodiments, step 470 is performed by an application running on the client computing device of step 410.

If the method determines in step 470 that the selected object of step 460 does not exist on the storage controller of step 410, then the method transitions from step 470 to step 480 and returns a FAILURE for version pre-check. Alternatively, if the method determines in step 470 that the selected object of step 460 does exist on the storage controller of step 410, then the method transitions from step 470 to step 510 (FIG. 5).

Referring now to FIG. 5, in step 510 the method determines if the selected object comprises either a method or a method parameter. In certain embodiments, step 510 is performed by the client computing device of step 410. In certain embodiments, step 510 is performed by an application running on the client computing device of step 410.

If the method determines in step 510 that the selected object does not comprises either a method or a method parameter, then the method transitions from step 510 to step 540. Alternatively, if the method determines in step 510 that the selected object does comprise either a method or a method parameter, then the method transitions from step 510 to step 520 wherein the method determines if the command or command parameter is enabled on the storage controller of step 410. In certain embodiments, step 520 is performed by the client computing device of step 410. In certain embodiments, step 520 is performed by an application running on the client computing device of step 410.

If the method determines in step 520 that the command or command parameter is not enabled on the storage controller of step 410, then the method transitions from step 520 to step 530 wherein the method returns FAILURE for the version pre-check. Alternatively, if the method determines in step 520 that the command or command parameter is enabled on the storage controller of step 410, then the method transitions from step 520 to step 540 wherein the method removes the object selected in step 460 from the object list of step 450. In certain embodiments, step 540 is performed by the client computing device of step 410. In certain embodiments, step 540 is performed by an application running on the client computing device of step 410.

In step 550, the method determines if the object list of step of step 450, as revised one or more times in step 540, is empty. In certain embodiments, step 550 is performed by the client computing device of step 410. In certain embodiments, step 550 is performed by an application running on the client computing device of step 410.

If the method determines in step 550 that the object list of step of step 450, as revised one or more times in step 540, is not empty, then the method transitions from step 540 to step 460 and continues as described herein. Alternatively, if the method determines in step 550 that the object list of step of step 450, as revised one or more times in step 540, is empty, then the method transitions from step 540 to step 560 and returns a value of SUCCESS for the version pre-check method.

In certain embodiments, individual steps recited in FIGS. 4 and 5 may be combined, eliminated, or reordered.

In certain embodiments, instructions, such as instructions 398 (FIGS. 2, 3) encoded in computer readable storage medium 396 (FIGS. 2, 3), wherein those instructions are executed by a processor, such as processor 394 (FIGS. 2, 3), to perform one or more of steps 420, 430, 440, 450, 460, 470, and/or 480, recited in FIG. 4, and/or one or more of steps 510, 520, 530, 540, 550, and/or 560, recited in FIG. 5.

In other embodiments, the invention includes instructions residing in any other computer program product, where those instructions are executed by a computer external to, or internal to, data storage library 100 (FIG. 3), data storage system 200 (FIG. 2), data storage system 300 (FIG. 3), to perform one or more of steps 610, 620, 625, 630, 640, 650, 660, 670, 680, 690, recited in FIG. 6, and/or one or more of steps 420, 430, 440, 450, 460, 470, and/or 480, recited in FIG. 4, and/or one or more of steps 510, 520, 530, 540, 550, and/or 560, recited in FIG. 5. In either case, the instructions may be encoded in computer readable storage medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to perform a version pre-check of a storage controller command, comprising:
generating a storage controller command comprising a plurality of objects;
extracting said plurality of objects from said command;
determining, without querying the storage controller, if each object comprising a command or a command parameter is enabled on said storage controller;
operative if each object comprising a command or a command parameter is enabled on said storage controller, indicating success for a version pre-check of the storage controller command;
forming an object list comprising said plurality of objects;
selecting an object from said object list;

determining if said selected object exists on said storage controller;

operative if said selected object does not exist on said storage controller, indicating failure for a version pre-check of the storage controller command;

operative if said selected object does exist on said storage controller, determining if said selected object comprises a command or a command parameter;

operative if said selected object does not comprise a command or a command parameter, removing said selected object from said object list;

operative if a selected object comprises a command or a command parameter, determining if said command or said command parameter is enabled on said storage controller;

operative if said command or said command parameter is enabled on said storage controller, removing said selected object from said object list wherein said storage controller is in communication with a host computing device; and wherein said host computing device performs said generating step, said extracting step, said determining step, and said indicating step;

creating a version pack comprising a list of all commands and command parameters that are enabled on said storage controller;

providing said version pack to said host computer.

2. The method of claim 1, wherein said command or command parameter is not enabled on said storage controller, further comprising indicating failure for a version pre-check of the storage controller command.

3. The method of claim 1, further comprising:
determining if said object list is empty;
operative if said object list is empty, indicating success for a version pre-check of the storage controller command.

4. The method of claim 1, wherein:
said storage controller is in communication with a host computing device;
said host computer comprises an application;
said application performs said generating step, said extracting step, said determining step, and said indicating step.

5. The method of claim 4, further comprising:
creating a version pack comprising a list of all commands and command parameters that are enabled on said storage controller;
providing said version pack to said application.

6. The method of claim 5, wherein said storage controller provides said version pack to said application when said application first communicates with said storage controller.

7. An article of manufacture comprising an application and a computer readable storage medium comprising computer readable program code disposed therein to perform a version pre-check of a storage controller command, wherein the article of manufacture is in communication with a storage controller, the computer readable program code comprising a series of computer readable program steps to effect:

generating a storage controller command comprising a plurality of objects;

extracting said plurality of objects from said command;

determining, without querying the storage controller, if each object comprising a command or a command parameter is enabled on said storage controller;

operative if each object comprising a command or a command parameter is enabled on said storage controller, indicating success for a version pre-check of the storage controller command;

forming an object list comprising said plurality of objects;

selecting an object from said object list;

determining if said selected object exists on said storage controller;

operative if said selected object does not exist on said storage controller, indicating failure for a version pre-check of the storage controller command;

operative if said selected object does exist on said storage controller, determining if said selected object comprises a command or a command parameter;

operative if said selected object does not comprise a command or a command parameter, removing said selected object from said object list;

wherein said selected object comprises a command or a command parameter recited in a command, said computer readable program code further comprising a series of computer readable program steps to effect:

determining if said command or said command parameter is enabled on said storage controller;

operative if said command or said command parameter is enabled on said storage controller, removing said selected object from said object list;

wherein said article of manufacture comprises a host computing device;

receiving from said storage controller a version pack comprising a list of all commands and command parameters that are enabled on said storage controller.

8. The article of manufacture of claim 7, wherein said command or said command parameter is not enabled on said storage controller, said computer readable program code further comprising a series of computer readable program steps to effect indicating failure for a version pre-check of the storage controller command.

9. The article of manufacture of claim 7, said computer readable program code further comprising a series of computer readable program steps to effect:
determining if said object list is empty;
operative if said object list is empty, indicating success for a version pre-check of the storage controller command.

10. The article of manufacture of claim 7, wherein said application comprises a storage management program, said computer readable program code further comprising a series of computer readable program steps to effect receiving said version pack by said storage management program when said application first communicates with said storage controller.

* * * * *